Aug. 9, 1966   J. W. HICKS, JR   3,265,480
METHOD OF MAKING METAL AND GLASS FIBER STRUCTURES
Original Filed Aug. 28, 1961   3 Sheets-Sheet 1
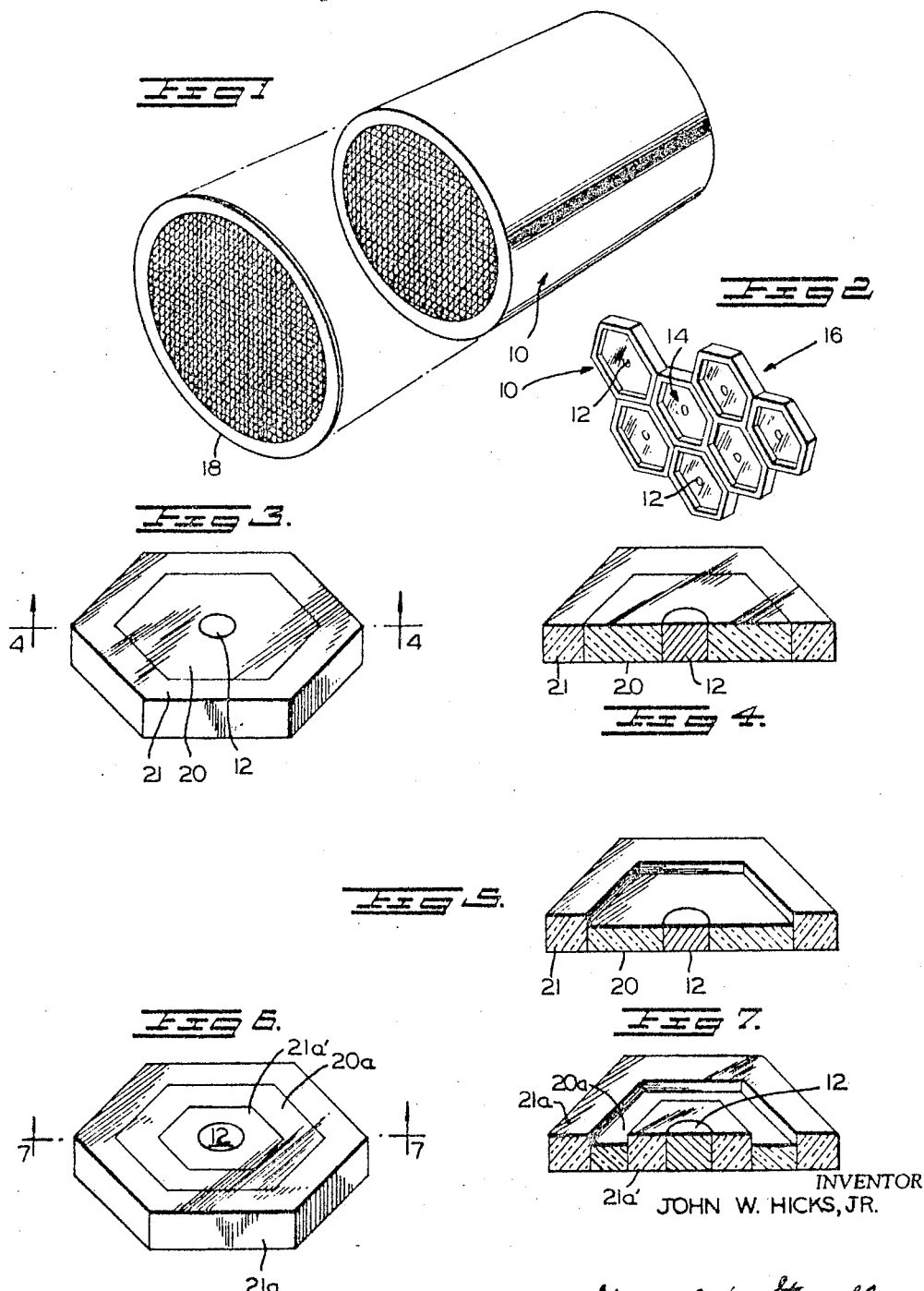
INVENTOR
JOHN W. HICKS, JR.
BY Stowell & Stowell
ATTORNEY

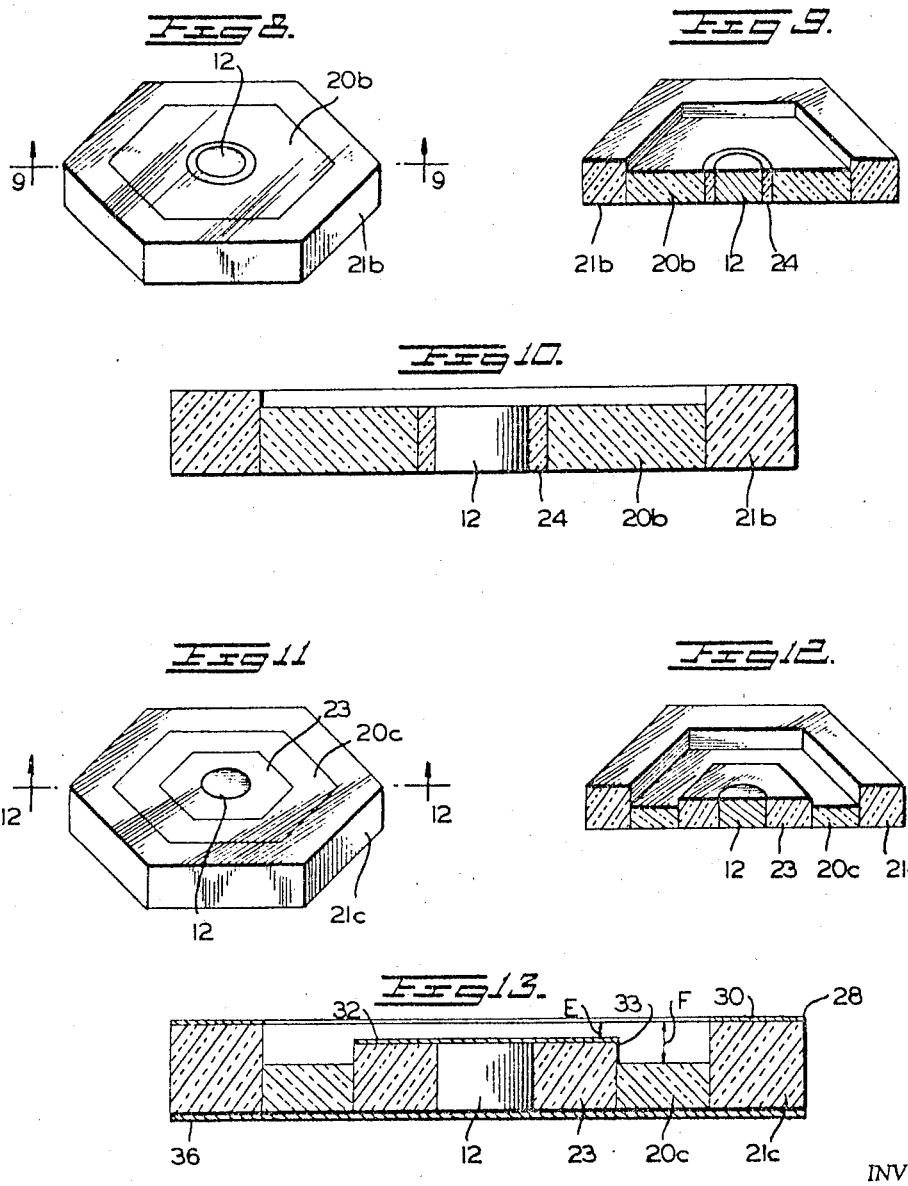

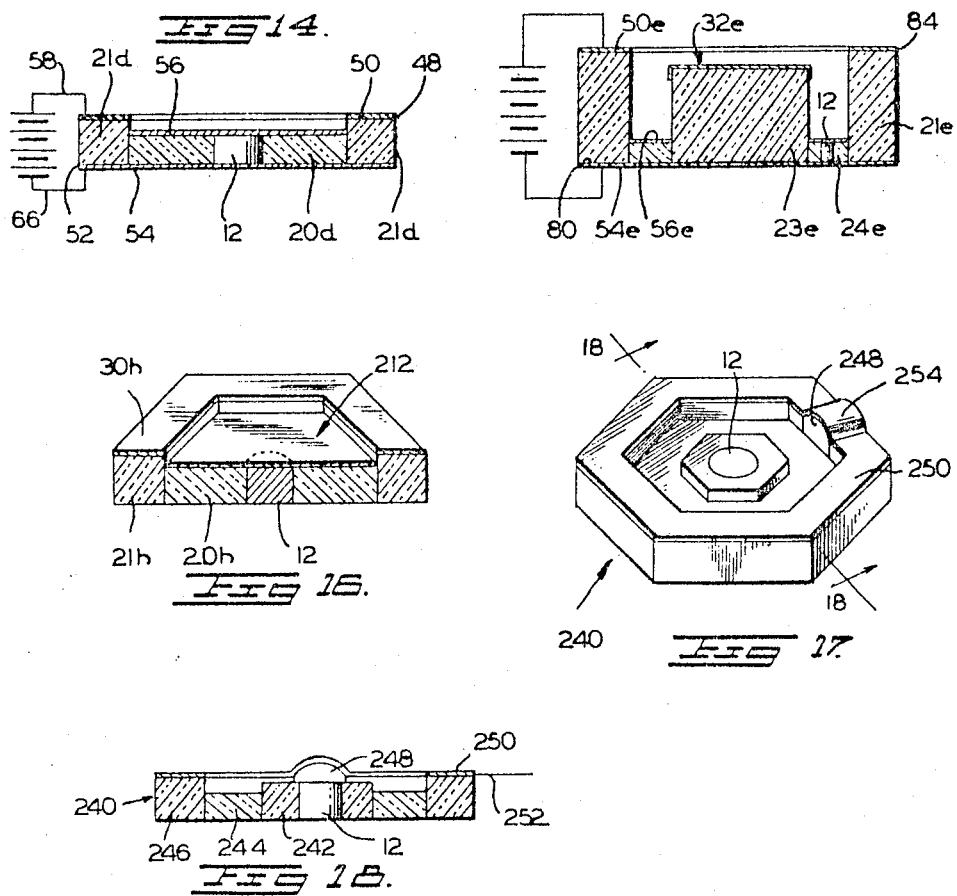

United States Patent Office 3,265,480
Patented August 9, 1966

3,265,480
METHOD OF MAKING METAL AND GLASS FIBER STRUCTURES
John W. Hicks, Jr., Fiskdale, Mass., assignor to Mosaic Fabrications, Inc., Southbridge, Mass., a corporation of Massachusetts
Original application Aug. 28, 1961, Ser. No. 134,342. Divided and this application Mar. 1, 1965, Ser. No. 443,740
8 Claims. (Cl. 65—4)

It will be seen that the method of the present invention may be employed in the production of novel metal-glass mosaic assemblies having utility in a plurality of arts, as more fully disclosed in application Serial No. 134,342, filed August 28, 1961, of which this application is a division.

This invention relates to improved methods of making metal and glass fiber structure.

It is an object of the present invention to provide a method of making an improved wire and glass fiber mosaic assembly wherein each of the wires of each mosaic element of the mosaic assembly is positioned within a glass member provided with a glass sleeve and said glass member and glass sleeve have different resistances to etching.

A further object is to provide a method of making a metal-glass mosaic assembly wherein each of the mosaic elements of the assembly has at least one end shaped and electrically and/or optically modified to alter the electrical and/or optical characteristics thereof.

A further object is to provide an improved method of making metal cored glass fiber mosaic assembly wherein portions of each mosaic element are electrically and/or optically interconnected while other portions of each of the mosaic elements of the mosaic assembly are electrically and/or optically independent of each of the other mosaic elements of the mosaic assembly.

Other objects and advantages of the present invention will be apparent to those skilled in the art from the following detailed description of the improved metal cored glass fiber structures, and assemblies thereof particularly described with reference to the accompanying drawings wherein:

FIG. 1 is a diagrammatic perspective view of a metal mosaic assembly having a glass jacket and a wafer shown sliced therefrom;

FIG. 2 is an enlarged perspective view of several mosaic elements of the mosaic assembly shown in FIG. 1;

FIG. 3 is an enlarged perspective view of one mosaic element consisting of a wire core, and a pair of concentric glass sleeves having different resistances to etching;

FIG. 4 is a section substantially on line 4—4 of FIG. 3;

FIG. 5 is a sectional view similar to that shown in FIG. 4 of a single mosaic element following a differential etch of the components thereof;

FIG. 6 is a perspective view of a modified form of a mosaic element consisting of a metal core surrounded by three glass sleeves having different resistances to etching;

FIG. 7 is a section substantially on line 7—7 of FIG. 6 following a differential etch of the mosaic element;

FIG. 8 is a perspective view of a modified mosaic element of the invention consisting of a metal core and three glass sleeves therefor with the glass sleeves having different resistances to etching;

FIG. 9 is a section substantially on line 9—9 of the mosaic element shown in FIG. 8 following a differential etch;

FIG. 10 is an enlarged view of the structure shown in FIG. 9 more clearly illustrating the features of the mosaic element;

FIG. 11 is a perspective view of a further form of a mosaic element including a wire core and three glass sleeves having different resistances to etching;

FIG. 12 is a section substantially on line 12—12 of FIG. 11 following a differential etch;

FIG. 13 is an enlarged sectional view of the structure shown in FIG. 12;

FIG. 14 is an enlarged sectional view of a mosaic element which may be employed in an image orthicon tube.

FIG. 15 is an enlarged sectional view similar to that shown in FIG. 14 of a modified form of mosaic element;

FIG. 16 is an enlarged perspective sectional view of a mosaic element which may be employed in an electrostatic printing apparatus;

FIG. 17 is an enlarged perspective view of a mosaic element which may be employed in an electrostatic printing apparatus;

FIG. 18 is a sectional view substantially on line 18—18 of the mosaic shown in FIG. 17.

In my co-pending application Serial No. 18,593 filed March 30, 1960, now abandoned, there is disclosed a metal cored glass fiber structure and a method of making such structure. The structures disclosed in said co-pending application in general consist of a composite mosaic comprising a plurality of hollow cylindrical glass outer members, each having a metallic inner member solidified from the fluent state in contact with the interior surface of the glass outer members and the outer surfaces of the glass members being fused into a homogeneous continuous matrix with the longitudinal axis of the metal cores lying generally in parallel. The resulting metal and glass mosaic assembly has been found to be very useful, when sliced into relatively thin wafers, as an electrical image conducting member for cathode ray tubes and the like.

Such structures have inherent disadvantages in that either the metal-to-glass ratio has been low and, hence, the electrical efficiency was low or the metal-to-glass ratio was high resulting in excessive capacitative couplings between the wire elements and spreading of secondary electrons. The present invention reduces these inherent disadvantages in the prior device and provides a metal and glass mosaic assembly having wide applications in the electrical and/or optical fields.

Referring to FIGS. 1 and 2 of the application drawings, 10 generally designates a metal cored glass fiber assembly composed of a plurality of wires 12 surrounded by glass tubes generally designated 14 with the axis of the wires generally lying parallel and the outer surfaces of the glass tubes being fused to adjacent glass tubes to provide a homogeneous structure. The homogeneous assembly of mosaic elements 16 consisting of a plurality of metallic wires having glass jackets may be provided with a jacket or sleeve 18 of glass, metal or the like, the type of jacket selected depending on the use for which the electrical and/or optical mosaic assembly is intended.

As more clearly shown in the enlarged perspective view in FIG. 2 of several mosaic elements of the mosaic assembly shown in FIG. 1, the glass jackets 14 are illustrated as having a generally hexagonal shape in section normal to the longitudinal axis of the wire cores. The hexagonal shape results from close packing of the plurality of mosaic elements during fusing of the outer surfaces thereof and/or drawing of a plurality of stacked metal cored glass fiber elements, as will be more fully discussed hereinafter.

When a wafer cut from a metal cored glass fiber assembly is employed as, for example, a face plate for a cathode ray tube or the like, a certain number of secondary electrons will be emitted from a wire when a primary electron strikes a wire. If the ratio of secondary electrons emitted from the wire to the primary electrons striking the wire is less than one, a net negative charge would remain on the wire, whereas if the ratio of secondary to primary electrons is greater than one, a net positive charge remains on the wire. If $r$ is the ratio, then $r$ minus 1 would represent a charge amplification factor and for highest electrical efficiency, $r$ minus 1 should be as large as possible.

It is known that such secondary electrons are emitted with a distribution or spread in energy averaging about two electron volts in magnitude. This average energy level is remarkably independent of the energy of the primary electron. Further, the secondary electrons are emitted in substantially all directions and their ultimate point of rest depends in part on their initial energy and direction and on the electric field in the vicinity of the electrons.

It has been found that by topically modifying, for example, by differential etching or abrasion, the contour of one or both ends of a wafer sliced from a metal and glass mosaic assembly and by modifying the electrical and/or optical properties of the topically modified end surfaces of the wafer, it is possible to obtain a high ratio of area of metal to total area while retaining low capacitative coupling and also to control secondary electron emission of the mosaic assembly thereby substantially improving the electrical and/or optical properties of devices employing such metal cored glass fiber wafers and opening up new fields of use therefor.

In general, control of the topography of the ends of the mosaic assembly is obtained by constructing each mosaic element from at least a wire core and a pair of concentric glass sleeves having different resistances to etching and, following assembly of a number of mosaic elements into a mosaic assembly, differentially etching the glass sleeves and coating or plating selected portions of the differentially etched mosaic assembly with materials having the desired electrical and/or optical properties.

FIG. 3 of the drawings is a greatly enlarged perspective view of one mosaic element consisting of a wire core 12 and a pair of concentric glass sleeves 20 and 21 having different resistances to etching and FIG. 4 is a section through the mosaic element shown in FIG. 3. Where the mosaic element is to be used as a face plate for a cathode ray tube, as many as one million metal cored glass fiber structures of the type shown in FIG. 3 per square inch may be included in the mosaic assembly, the diameter of each of the metal cores 12 being, for example, about .0004 inch. The number of mosaic elements per square inch of the mosaic assembly and the diameter of the metal cores thereof is illustrative only and the number and diameter thereof may be widely varied, depending upon the particular uses for which the mosaic assembly is fabricated.

The metal cores 12 may be formed of substantially any metal composition that will bond to glass if the wire is formed first and then clad with the concentric glass sleeves. For example, aluminum, nickel, tungsten, or iron wire will provide satisfactory results and the selection of the metal would depend to a large extent on the ultimate use of the mosaic assembly. For example, where the electrode is to have good secondary electrode emission, a metal such as nickel may be plated on the wire electrodes and where low secondary emission is desired, a metal such as gold may be employed as the core for the mosaic elements.

Where the wire is formed in the glass tubes from the liquid state as disclosed in my co-pending application Serial No. 18,593, a copper-silver alloy has been found to provide very satisfactory mosaic elements. The following compositions have been found to be very satisfactory:

(a) silver 50%; copper 15.5%; zinc 16.5%; cadmium 18%; solidus 1,160° F., liquidus 1,175° F.

(b) silver 15%; copper 80%; phosphorus 5%; solidus 1,185° F., liquidus 1,500° F.

In order to topically modify the contour of the ends of the mosaic assembly glasses 20 and 21 may have different etching or abrasion characteristics. Further, where light is to be channelled through the mosaic assembly, the light transmitting path would comprise concentric glass tube 20 which should have a high index of refraction while the outer glass sleeve 21 should have a lower index of refraction, as is generally known in the fiber optics art. Generally, the light transmitting member 20 for optimum optical properties should be insulated from the wire core 12 by a glass having a lower index of refraction than the light transmitting channel formed by glass sleeve 20 as to be more fully described hereinafter.

Lead oxide or lanthanum oxide glasses are very etchable and provide glasses having high indices of refraction. Pure silica glass has a very low index of refraction and the following additives increase the index of refraction in the order listed: lithium oxide, sodium oxide, potassium oxide, calcium oxide, lead oxide, and lanthanum oxide.

As hereinbefore discussed, through the proper selection of a glass composition, a glass mosaic element having differential etching characteristics may be readily constructed. In general, high lead content silicate glasses or high borax, high alkali glasses, will etch more rapidly with acids such as hydrochloric or nitric or mixtures thereof than the high silica glasses. As a general rule, starting with any common silicate glass composition, by the addition of an alkali, borax, or lead, the etchability in all acids of the resulting glass increases. A glass suitable for the inner glass sleeve 20 may comprise: $SiO_2$, 35% by weight; $PbO$, 85% by weight; $K_2O$, 7% by weight.

A glass highly resistant to etching and suitable for the outer concentric glass sleeve 21 may comprise: $SiO_2$, 81% by weight; $Na_2O$, 3.5% by weight; $K_2O$, .4% by weight; $B_2O_3$, 12.9% by weight; and $Al_2O_3$, 2.2% by weight.

A glass composition having an etching rate intermediate the above mentioned glass compositions comprises: $SiO_2$, 73.6% by weight; $K_2O$, .6% by weight; $Na_2O$, 16% by weight; $CaO$, 5.2% by weight; $MgO$, 3.6% by weight; $Al_2O_3$, 1% by weight. This glass also has the important property that it will not slag with conventional metal fibers employed in the construction of suitable metal cored mosaic elements.

It will be particularly noted that the glass listed above which is highly etchable has a high index of refraction while the glasses having the intermediate and high resistances to etching have lower indices of refraction thus permitting topical modification of the mosaic elements of the assembly without reducing the light transmitting properties of the wire cored mosaic assembly.

Various methods may be employed in the manufacture of the very fine metal cored glass fiber elements and the composite mosaic assembly and as hereinbefore set forth, the metal cores may be formed in concentric glass tubes from a melt of both the glass and the metal stock, as disclosed in application Serial No. 18,593, or concentric glass tubes with a preformed wire may be drawn. Where the composite mosaic element is formed as disclosed above, the wire cores do not materially change in diameter during drawing and the size of the wire for the core is selected prior to the drawing operation. Following the initial formation of each element consisting of a wire core and at least a pair of concentric glass tubes, the resulting element may then be cut into suitable lengths stacked like cord wood, reheated and pressed through a suitable die to fuse and press the outer surface of each of the concentric glass tubes of each of the mosaic elements to adjacent glass tubes to provide a homogeneous structure. During the pressing operation, the individual mosaic elements generally assume a hexagonal shape in cross section which results from the close packing of the cylindrical elements. The composite homogeneous structure may then be reheated and redrawn to further reduce the diameter of the resulting mosaic assembly and each of the concentric glass sleeves of each of the elements thereof.

Another method of forming the mosaic assembly is to form each element from a melt, cut the formed elements into suitable lengths and place them within a large highly etchable glass tube. By reheating and drawing the elements and the glass tube progressively through heated reducing dies, the diameter of the individual elements and the resulting diameter of the mosaic assembly is suitably reduced. This drawing operation reduces the diameter of the wire cores in proportion to the reduction in the diameter of the assembly. When the mosaic assembly reaches the desired diameter, the outer glass tube of highly etchable glass may then be removed by etching.

Another method of making the mosaic assemblies is to form each of the mosaic elements from a melt, group a plurality of such elements and re-draw the elements until a suitable diameter is achieved. The groups of re-drawn elements are then cut and stacked like cord wood, placed in a heated die under pressure to fuse the groups of elements into a large homogeneous metal cored glass fiber assembly.

The composite mosaic assembly of wire cored glass fibers may have a finished diameter of, for example, 6 to 10 or more inches, the finished diameter being determined by the dimensions of the device in which the mosaic assembly is to be used. The mosaic assembly is then sliced into a plurality of relatively thin wafers as illustrated in FIG. 1. These wafers are ground and polished, using conventional glass grinding and polishing techniques. The wafers are then ready for use or finishing to provide the improved electrical and/or optical properties.

Referring to FIG. 5 of the drawings, the mosaic element illustrated in FIGS. 3 and 4 is shown following etching of the wire core 12 and the first concentric glass tube 20 to provide a glass web about each glass sleeve 20 and wire 12 as illustrated in FIG. 2. Following the grinding and polishing to the desired thickness, the face opposite the face to be processed is coated with a protective layer of material such as polyethylene wax. The wafer is then dipped in concentrated nitric and hydrochloric acid, for example, a 50–50 mixture, for about 5 minutes, then rinsed and dipped in a 5% hydrofluoric acid bath for about 1 minute, then rinsed. This procedure is repeated until the proper depth of etch is achieved. The nitric acid-hydrochloric acid mixture attacks the glass 20 but does not attack the glass 21. While attacking the glass 20 the acid leaves a residue of silica particles in the etched openings which, as the openings become deeper, are increasingly hard to rinse out. The hydrofluoric acid dip removes this debris. However, the hydrofluoric acid also attacks the outer glass sleeve 21 and, therefore, the hydrofluoric acid dipping is kept to a minimum.

When the acid etch comprises nitric acid and hydrochloric acid, the metal cores 12 are also etched as the inner glass sleeves etch. Where the inner glass sleeves are etched by an acid which would not also etch the thin metal cores as the glass sleeves are etched, the upstanding ends of the metal cores are thereafter removed by etching with a suitable acid.

Another satisfactory etching bath may comprise 25% nitric acid, 25% hydrochloric acid and 50% water by weight. The wafer is placed in this bath for approximately 15 minutes, rinsed in water, then etched for 1 minute in hydrofluoric acid, then rinsed in a dilute sodium hydroxide solution. If this cycle is repeated, for example, 10 times, it has been found that fibers having a diameter of about .004 inch will have etched to a depth of about .004 inch. Where a deeper etch is desired, it has been found to be advisable to etch the wafers in an ultrasonic bath where the high frequency vibrations assist in directing the etchant into the etched openings and the ultrasonic bath also aids in removing the silica debris left by the etchant.

Where both faces of the wafer are to be topically modified, both faces may be etched at the same time or at different times through the use of a suitable investment, such as a polyethylene wax, and it will also be appreciated that one face of the wafer may be etched deeper than the opposite face.

Referring to FIGS. 6 and 7, there is illustrated a modified mosaic element comprising a metal core 12, a first concentric glass sleeve 21a, a second concentric glass sleeve 20a, and a third concentric glass sleeve 21a'. Glass sleeves 21a and 21a' correspond to the outer glass sleeve 21 of FIGS. 3, 4 and 5, and are composed of a glass highly resistant to etching while glass sleeve 20a corresponds to glass sleeve 20 of FIGS. 3, 4 and 5 and is composed of a glass that is highly etchable.

The mosaic element shown in FIGS. 6 and 7 is formed as described with reference to FIGS. 3 through 5 and the elements are formed into a mosaic assembly, sliced into wafers which are then ground and polished and a resulting wafer etched on one face to provide a structure as illustrated in FIG. 7 wherein the outer glass sleeves 21a, the innermost glass sleeves 21a', and the metal cores 12 are substantially at their ground and polished thickness while glass sleeves 20a have been etched on one face to the desired depth.

Referring to FIGS. 8, 9 and 10, there is shown a glass cored mosaic element having three concentric glass sleeves with each of the glass sleeves having different properties. The metal core 12 is the same as metal core 12 of FIGS. 3 through 5, the outer glass sleeve 21b may be the same composition as glass sleeve 21 of FIGS. 3 through 5 and is highly resistant to etching; glass sleeve 20b may be the same composition as glass sleeve 20 of the mosaic element shown in FIGS. 3 and 5 and is, therefore, highly etchable while the thin walled sleeve 24 surrounding the wire core 12 is selected to have substantially the same etching rate as glass 20b; however, the glass sleeve 24 is selected to have non-slagging properties with the metal core 12. It will also be appreciated that the thin walled glass sleeve 24 may be selected to have a lower index of refraction than glass sleeve 20b to improve the image or light transmitting properties of glass sleeve 20b. A suitable non-slagging glass for use in constructing the glass sleeve 24 of the mosaic element illustrated in FIGS. 8 through 10 may consist of 70% by weight $SiO_2$; .1% by weight of $CaO$; .2% by weight $K_2O$; 28% by weight of $B_2O_3$; .2% by weight of $MgO$; 1.1% by weight of $Al_2O_3$; and 1.2% by weight of $Li_2O$.

This glass also has a lower index of refraction than glass 20b.

After forming the mosaic element illustrated in FIGS. 8 through 10 by a process as described with reference to FIGS. 3 through 5, a composite mosaic assembly is formed, sliced into wafers, ground, polished and etched so that the metal core 12, its immediate glass sleeve 24 and glass sleeve 20b are etched to a depth lower than the glass sleeve 21b thereby forming a web interconnecting all of the mosaic elements of the assembly.

Referring to FIGS. 11 and 12, there is shown a further form of a mosaic element including a wire core 12 and three glass sleeves having different resistances to etching and/or degrees of oxidation of metals designated from the core outwardly, 23, 20c and 21c. Glasses 20c and 21c correspond to glasses 20 and 21 illustrated and described with reference to FIGS. 3, 4 and 5 while glass 23 which surrounds the metal core 12 has an intermediate rate of etching and has the important property that it does not slag with the metal fiber.

This glass may have a composition consisting of 73.6% by weight of $SiO_2$; .6% by weight of $K_2O$; 16% by weight of $Na_2O$; 5.2% by weight of $CaO$; 3.6% by weight of $MgO$; and 1% by weight of $Al_2O_3$.

Following the formation of the mosaic elements and fusing the plural elements into a mosaic assembly with or without subsequent drawing of the composite assembly as hereinbefore described, a wafer is cut from the assembly, ground, polished and then etched. Since glass sleeves 21c, 20c and 23 each have a different rate of etching, the resulting structure consists of an outer glass ring having the greatest thickness, an inner glass ring 23 about the metal core 12 which is etched to a depth E and a glass sleeve 20c, between glass sleeve 23 and 21c, which etches to a depth indicated as F greater than the depth E.

Referring specifically to FIG. 13, in order to further modify the electrical characteristics of the device of the invention, the surfaces 28 of each of the elements 21c of the mosaic assembly may be coated with a metal to provide an electrically conductive path interconnecting each of the mosaic elements of the assembly. In FIG. 2 of the drawings, the form of such a metallic web is clearly shown and the metallic web is illustrated at 30 in FIG. 13. Also to improve the electrical characteristics of the assembly, a metallic cap 32 is placed on the face 33 of glass sleeve 23. The metal wire 12 serves to carry an electrical current from one face of the wafer to the opposite face and the metal cap 32 which is placed over the glass sleeve 23 and the wire 12 effectively increases the efficiency of the mosaic and in a manner funnels electrical charges received thereon to the wire 12.

The metal grid 30 placed on the faces 28 of glass sleeves 21c provides a continuous honeycomb-like electrode uniformly spaced from each of the wires 12 and caps 32. If the metal grid 30 is maintained by suitable connection to a source of electric current at a voltage level such that $r-1$ is positive, the grid will attract secondary electrons and capture them. The low energy secondary electrons will not knock out tertiary electrons from the grid. Thus, the capturing of the secondary electrons prevents spurious charges on neighboring electrodes. If, however, $r-1$ is to be negative, the metallic grid 30 is maintained at a voltage level which will repel secondary electrons and drive them back onto the wire 12 and its metallic cap 32.

It will be apparent to those skilled in the art that due to the small diameter of the metal wire 12, the interwire capacitance will be small. It will also be apparent that there is a disproportionate capacitance between the metal caps 32 of the assembly; however, this capacitance is substantially less than would exist between wires having a diameter equal to the diameter of the metal caps 32. Moreover, if dimensions E and F are nearly equal so that the cap and the grid are more or less coplanar, then the grid further reduces interelectrode capacitance and the cap-to-cap capacitance can be made negligibly small.

It is further pointed out that the glass matrix 23 supporting the wire 12 has a dielectric constant of from about 5 to about 10 and by etching the sleeves as shown in FIG. 13, the cap-to-grid or cap-to-cap capacitance is still further reduced. In construction devices utilizing the improved optical/electrical mosaic, the relative value of F and E is selected to obtain the best compromise between suppressing or capturing secondary electrons and reducing the capacitance of the assembly.

It is further pointed out that by decreasing the diameter of the wires 12, the entire mosaic assembly is strengthened mechanically since the glass-to-metal bond is relatively poor compared to a glass-to-glass bond. It is, therefore, advantageous to reduce the area of the metal-to-glass bond. In the practice of the present invention due to the extremely small diameter of the wires, the mosaic assembly can be made almost as strong as solid glass; hence permitting the use of thin wafers which results in further reducing the capacitance of the assembly. Another advantage of employing a metal cap 32 on the wire 12 is that the composition of the cap may differ from the composition of the wire metal. For example, the wire metal may comprise a metal that is a poor secondary electron emitter and when a high secondary electron emission is desired, the cap can be chosen to comprise a material having good secondary electron emitting properties. As will be more fully described hereinafter, the cap may comprise a material having photocathodic properties. Further, the opposite face of the mosaic assembly may be coated with metal or an electrically conductive and optically transparent material 36 such as NESA, consisting essentially of tin oxide. The layer 36, the metallic grid 30 and the cap 32 may be variously applied to the etched mosaic assembly. If the distance E is zero whereby the surface 28 is in substantially the same plane as the surface 34, a metallic paint, consisting of a metal suspended in a suitable organic binder, which may include oxides and fluxes, may be rolled or stamped onto the mosaic assembly. The coated assembly is subsequently heated to burn out the organic carriers and improve the adhesion of the coating to the glass. Alternatively, a metal may be evaporated onto the surfaces 28 and/or 33. Where evaporative metallic coating processes are employed, a slight amount of the metal may form on the sides of the etched contour of the mosaic assembly which is subsequently removed by a light acid etch.

From the foregoing description of FIGS. 1 through 13, it will be seen that the present invention provides new and improved metal cored glass fiber structures and devices wherein the metal core is surrounded by at least a pair of concentric glass sleeves having different resistances to etching or abrading whereby wafers, sliced from a homogeneous group of such structures and assembled into a mosaic assembly, may be topically modified on one or both faces of the wafers to provide useful metal-glass mosaic devices or assemblies which may be further modified as to be more fully described hereinafter to improve the electrical and/or optical properties thereof.

The mosaic assembly of the invention may be usefully employed in image transducers. A mosaic element of such a mosaic assembly 48 is illustrated in FIG. 14 and comprises a metal wire 12, a first concentric glass sleeve 20d and a second concentric glass sleeve 21d. The metal core and the pair of glass sleeves are of the type illustrated in FIG. 5 and the metal core 12 and the glass sleeve 20d have been etched below the face of the glass sleeve 21d and a homogeneous assembly of these units is mounted in an image orthicon tube so that the unetched end of the wafer in parallel with the inner surface of the face of the tube while the opposite end of the wafer is directed toward the electron emitting gun.

The inner or gunward surface of the mosaic element illustrated in FIG. 14 is provided with an electrical conductive metallic coating 50 which may be applied as previously described with reference to FIG. 13 of the drawings. The outer surface 52 of the wafer is provided with an electrically conductive light transmitting coating 54 which may be identical to coating 36 illustrated in FIG. 13. The etched surface of wire 12 and the etched surface of glass sleeve 20d are suitably coated with a photocathodic material 56 of any of the conventionally known types. The metallic honeycomb grid 50 is connected by an electrical conductor 58 to a source of electric current. The coating 54 of the mosaic assembly is also connected to the source of electric current through a conductor 66. With this arrangement, light from a suitable object passing through the face plate of an orthicon tube passes through the coating 54 and is transmitted through the glass 20d to the photocathode 56 modifying its electrical characteristics. Primary electrons from the scanning gun 42 on striking the photocathodes 56 of the plurality of mosaic elements cause them to give off secondary electrons, the number of which depends in part upon the amount of light passing through the glass elements 20d of each particular element. The secondary electrons emitted by the said photocathodes are collected by the metallic web 50 and amplified by an amplifier.

From the foregoing discussion it will be appreciated that the optical image formed on the photocathodes and the number of electrons released therefrom by the primary electrons from the electron gun 42 may be substantially increased by including within the system a good secondary electron emitter coupled with the metallic grid and the photocathodes.

Such an improved structure is illustrated in FIG. 15 where each of the mosaic elements of the mosaic assembly consists of a glass rod 23e, a first glass sleeve 24e having a wire 12 positioned therein and a third glass sleeve 21e. The relative resistances to etching of these glasses is in the order illustrated and described with reference to FIG. 13. The outer unetched surface 80 of the mosaic assembly is coated with a suitable electrically conductive and light transmitting coating 54e, the etched inner surface of the glass sleeve 24e and wire 12 are coated with a photocathode material, the etched surface of glass rod 23e is coated with a metal having good secondary electron emission properties while the surfaces 84 of sleeves 21e are provided with a metallic coating 50e which forms the grid web.

With this form of construction, it will be apparent that the cooperation between the photocathode 56e and the good electron emitter 32e will produce a greater number of electrons which will travel to the web 50e upon being energized by the light source. This will drive the cap 32e positive faster than the cap 56 of the form of the invention shown in FIG. 14.

The methods of the invention also are useful in constructing face plates for electrostatic printing devices and such a useful mosaic is illustrated in FIGURE 16.

Such a mosaic assembly is constructed as disclosed in FIGS. 3, 4 and 5 of the application and includes a fine wire core 12, a first glass sleeve 20h and a second glass sleeve 21h. As described with reference to FIGS. 3 through 5, the glass sleeve 20h is constructed of glass that is readily etchable with respect to glass sleeve 21h whereby to provide a honeycombed webbing surrounding the plurality of glass sleeves 20h and the fine wires 12. The glass webbing is coated with a conductive metal 30h and each of the wires 12 and its surrounding glass sleeve 20h is also coated with a conductive metal layer generally designated 212. The conductive metal layer 212 is preferably a relatively poor secondary electron emitter.

With the arrangement shown in FIG. 16 the very fine wire electrodes 12 of about .004 inch in diameter corona very readily due to the intense field surrounding the wires. In operation of the device the cathode ray tube is controlled by indicia on an original document which may be viewed by a suitable mechanical or television type scanning device.

In FIGS. 17 and 18, a system of wire cored glass fiber mosaic structures is shown which would provide substantial amplification. Referring to these drawings, there is shown a mosaic assembly 240 positioned to receive the electrons from a cathode ray gun.

The mosaic assembly 240 includes the wire core 12, a first glass sleeve 242, a second glass sleeve 244, and a third and outer glass sleeve 246. The outer glass sleeve 246 has a further glass member 248 introduced in at least one area of a wall thereof. The relative etchability of the glasses 242, 244, 246 and 248 is such that glass 248 is the most resistant to etching, glass 244 is the most etchable and glass 242 is more readily etched than glass 246 comprising the greater portion of the outer glass sleeve of each of the mosaic elements of the mosaic assembly. The glass 248 may extend from face to face of the wafer forming the mosaic assembly whereby the glass sleeve 246 comprises two glass compositions.

Following the acid etching of a ground and polished wafer constructed from the four glass members and the wire core, the etched face of the mosaic 240 is contoured as illustrated in FIGS. 17 and 18. The honeycombed web formed by the outer glass sleeve 246 of each of the mosaic elements including the projecting blip or boss formed by glass member 248 is provided with a layer of conductive metal 250 which is connected to a pulsing potential synchronized with an electron gun.

I claim:
1. A method of making a metal cored glass fiber mosaic assembly comprising forming a mosaic element by heating at least a pair of concentric glass sleeves having different resistances to etching having a metallic member threaded therethrough to a temperature at least at which the glass sleeves are in a plastic state, draughting the composite stock to form a relatively small element having a metal core and at least a pair of concentric glass sleeves, fusing the outer sleeves of a plurality of said elements to form a mosaic assembly with the metal cores lying generally parallel, and thereafter topically modifying by differential etching at least a portion of at least one of said glass sleeves of each of said elements at at least one end of the assembly.

2. A method of making a metal cored glass fiber mosaic assembly comprising forming a mosaic element by heating at least a pair of concentric glass sleeves having different resistances to etching having a metallic member threaded therethrough to a temperature at least at which the glass sleeves are in a plastic state, draughting the composite stock to form a relatively small element having a metal core and at least a pair of concentric glass sleeves, fusing the outer sleeves of a plurality of said elements to form a mosaic assembly with the metal cores lying generally parallel, and thereafter topically modifying by differentially etching a portion of at least the inner sleeve of said pair of glass sleeves of each of said elements at at least one end of the assembly.

3. A method of making a metal cored glass fiber mosaic assembly comprising forming a mosaic element by heating at least a pair of concentric glass sleeves having different resistances to etching having a metallic member threaded therethrough to a temperature at least at which the glass sleeves are in a plastic state, draughting the composite stock to form a relatively small element having a metal core and at least a pair of concentric glass sleeves, fusing the outer sleeves of a plurality of said elements to form a mosaic assembly with the metal cores lying generally parallel, and thereafter etching the inner sleeve of said elements to a level below the level of the outer sleeve of each of the pair of sleeves at at least one end of the assembly to provide a continuous outwardly projecting web of glass about the metal core of each of said elements.

4. A method of making a metal cored glass fiber mosaic assembly comprising forming a mosaic element by heating at least a pair of concentric glass sleeves having different resistances to etching having a metallic member threaded therethrough to a temperature at least at which the glass sleeves are in a plastic state, draughting the composite stock to form a relatively small element having a metal core and at least a pair of concentric glass sleeves, fusing the outer sleeves of a plurality of said elements to form a mosaic assembly with the metal cores lying generally parallel, and thereafter etching the inner sleeve of said elements to a level below the level of the outer sleeves of each of the pair of sleeves at at least one end of the assembly to provide a continuous outwardly projecting web of glass about the metal core of each of said elements and applying an electrically conductive coating to said outwardly projecting web of glass.

5. A method of making a metal cored glass fiber mosaic assembly comprising forming a mosaic element by heating at least a pair of concentric glass sleeves having different resistances to etching having a metallic member threaded therethrough to a temperature at least at which the glass sleeves are in a plastic state, draughting the composite stock to form a relatively small element having a metal core and at least a pair of concentric glass sleeves, fusing the outer sleeves of a plurality of said elements to form a mosaic assembly with the metal cores lying generally parallel, and thereafter etching the inner sleeve of said elements to a level below the level of the outer sleeve of each of the pair of sleeves at at least one end of the assembly to provide a continuous outwardly projecting web of glass about the metal core of each of said elements, applying an electrically conductive coating to said continuous outwardly projecting web of glass and a further electrically conductive coating to each of said metal cores and to a portion of the glass sleeve immediately theresurrounding.

6. A method of making a metal cored glass fiber mosaic assembly comprising forming a mosaic element by heating at least a pair of concentric glass sleeves having different resistances to etching having a metallic member threaded therethrough to a temperature at least at which the glass sleeves are in a plastic state, draughting the composite stock to form a relatively small element having a metal core and at least a pair of concentric glass sleeves, fusing the outer sleeves of a plurality of said elements to form a mosaic assembly with the metal cores lying generally parallel, and thereafter etching the inner sleeve of each of said elements to a level below the level of the outer sleeve at one end of the assembly to provide a continuous outwardly projecting web of glass about the metal core of each of said elements at said one end, applying an electrically conductive light transparent coating to the other end of the assembly and applying an electrically conductive coating to said continuous outwardly projecting web of glass.

7. A method of making a metal cored glass fiber mosaic assembly comprising forming a mosaic element by heating at least a pair of concentric glass sleeves having different resistances to etching having a metallic member threaded therethrough to a temperature at least at which the glass sleeves are in a plastic state, draughting the composite stock to form a relatively small element having a metal core and at least a pair of concentric glass sleeves, fusing the outer sleeves of a plurality of said elements to form a mosaic assembly with the metal cores lying generally parallel, and thereafter etching the inner sleeve of each of said elements to a level below the level of the outer sleeve at one end of the assembly to provide a continuous outwardly projecting web of glass about the metal core of each of said elements at said one end, applying an electrically conductive light transparent coating to the other end of the assembly, applying an electrically conductive coating to said continuous outwardly projecting web of glass and applying a further electrically conductive coating to each of the wire cores and to a portion of at least each of the glass sleeves about each of said wire cores.

8. A method of making a metal cored glass fiber mosaic assembly comprising forming a mosaic element by heating at least a pair of concentric glass sleeves having different resistances to etching having a metallic member threaded therethrough to a temperature at least at which the glass sleeves are in a plastic state, draughting the composite stock to form a relatively small element having a metal core and at least a pair of concentric glass sleeves, fusing the outer sleeves of a plurality of said elements to form a mosaic assembly with the metal cores lying generally parallel, and thereafter etching the inner sleeve of each of said elements to a level below the level of the outer sleeve at one end of the assembly to provide a continuous outwardly projecting web of glass about the metal core of each of said elements at said one end, applying an electrically conductive light transparent coating to the other end of the assembly, applying an electrically conductive coating to said continuous outwardly projecting web of glass and applying a photoemissive coating to the etched portion of each of said members.

References Cited by the Examiner
UNITED STATES PATENTS

| | | | |
|---|---|---|---|
| 2,197,753 | 4/1940 | Liebmann | 29—25.18 X |
| 2,608,722 | 9/1952 | Stuetzer | 65—4 X |
| 2,619,438 | 11/1952 | Varian et al. | |
| 2,749,794 | 6/1956 | O'Leary | 65—31 X |
| 2,995,970 | 8/1961 | Hicks et al. | 65—43 X |
| 3,195,219 | 7/1965 | Woodcock et al. | 65—31 X |

DONALL H. SYLVESTER, *Primary Examiner.*

F. W. MIGA, *Assistant Examiner.*